United States Patent [19]
Breed et al.

[11] Patent Number: 5,748,473
[45] Date of Patent: May 5, 1998

[54] AUTOMATIC VEHICLE SEAT ADJUSTER

[75] Inventors: David S. Breed, Boonton Township, N.J.; Wilbur E. DuVall, Kimberling City, Mo.

[73] Assignee: Automotive Technologies International, Inc., Denville, N.J.

[21] Appl. No.: 474,784

[22] Filed: Jun. 7, 1995

Related U.S. Application Data

[63] Continuation-in-part of Ser. No. 239,978, May 9, 1994, which is a continuation-in-part of Ser. No. 40,978, Mar. 31, 1993, which is a continuation-in-part of Ser. No. 878,571, May 5, 1992, abandoned.

[51] Int. Cl.$^6$ ..................................................... B60R 21/28
[52] U.S. Cl. ........................... 364/424.055; 364/424.059; 280/735; 180/273; 297/410; 307/10.1
[58] Field of Search ................ 364/424.055, 424.056, 364/424.057, 424.059, 460, 461; 280/734, 735, 736; 297/403, 408, 410; 307/10.1; 340/436, 903; 180/268, 272, 273

[56] References Cited

U.S. PATENT DOCUMENTS

| | | | |
|---|---|---|---|
| 3,275,975 | 9/1966 | King | 180/272 |
| 4,519,652 | 5/1985 | Kamijo | 180/268 |
| 4,625,320 | 11/1986 | Ishikawa | 382/104 |
| 4,645,233 | 2/1987 | Bruse et al. | 297/410 |
| 4,811,226 | 3/1989 | Shinohara | 364/424.059 |
| 5,008,946 | 4/1991 | Ando | 180/167 |
| 5,071,160 | 12/1991 | White et al. | 280/735 |
| 5,074,583 | 12/1991 | Fujita | 280/735 |
| 5,118,134 | 6/1992 | Mattes | 280/735 |
| 5,125,686 | 6/1992 | Yano | 280/801.2 |
| 5,155,685 | 10/1992 | Kishi et al. | 364/424.059 |
| 5,161,820 | 11/1992 | Vollmer | 280/730 |
| 5,254,924 | 10/1993 | Ogasawara | 364/424.059 |
| 5,330,226 | 7/1994 | Gentry et al. | 280/735 |
| 5,413,378 | 5/1995 | Steffens, Jr. et al. | 280/735 |
| 5,439,249 | 8/1995 | Steffens, Jr. et al. | 280/735 |
| 5,454,591 | 10/1995 | Mazur et al. | 280/735 |
| 5,474,327 | 12/1995 | Schousek | 280/735 |
| 5,531,472 | 7/1996 | Semchena et al. | 280/735 |
| 5,573,269 | 11/1996 | Gentry et al. | 280/735 |

*Primary Examiner*—Gary Chin

[57] ABSTRACT

An automatic seat adjustment system for a motor vehicle having a passenger compartment with a seat in which an occupant sits. The seat has power mechanisms for moving the seat relative to the passenger compartment from an initial position to an adjusted position, and control mechanisms connected to the power mechanisms for controlling the power mechanisms. Generally, the system includes measurement devices for measuring at least one morphological characteristic of the occupant and generating a first signal representative of the magnitude of that morphological characteristic, a processor including computational means for determining an adjusted seat position based on that measured morphological characteristic and which generates a second signal corresponding to the adjusted seat position, a first input device coupled to the measurement devices and to the processor for inputting the first signal into the processor; and a second input device coupled to the processor and the control mechanisms for inputting the second signal into the control mechanisms. In this manner, the control mechanism is able to affects the operation of the power mechanisms to move the seat to the adjusted position.

20 Claims, 11 Drawing Sheets

AUTOMATIC VEHICLE SEAT ADJUSTER

This application is a Continuation-In-Part of U.S. patent application Ser. No. 08/239,978, filed May 5, 1994, relating to a vehicle interior identification and monitoring system which in turn is a Continuation-In-Part of U.S. patent application Ser. No. 08/040,978, filed Mar. 31, 1993 which in turn is a Continuation-In-Part of U.S. patent application Ser. No. 07/878,571, filed May 5, 1992, abandoned, and is related to U.S. patent application Ser. No. 8/476,882 entitled rear impact occupant protection apparatus filed simultaneously herewith on Jun. 7, 1995, all of which are included herein by reference.

BACKGROUND OF THE INVENTION

The adjustment of an automobile seat occupied by a driver of the vehicle is now accomplished by the use of either electrical switches and motors or by mechanical levers. As a result, the driver's seat is rarely placed at the proper driving position which is defined as the seat location which places the eyes of the driver in the so-called "eye ellipse" and permits him or her to comfortably reach the pedals and steering wheel. The "eye ellipse" is the optimum eye position relative to the windshield and rear view mirror of the vehicle.

The eye ellipse, which is actually an ellipsoid, is rarely achieved by the actions of the driver for a variety of reasons. One specific reason is the poor design of most seat adjustment systems particularly the so-called "4-way-seat". It is known that there are three degrees of freedom of a seat bottom, namely vertical, longitudinal, and rotation about the lateral or pitch axis. The 4-way-seat provides four motions to control the seat: (1) raising or lowering the front of the seat, (2) raising or lowering the back of the seat, (3) raising or lowering the entire seat, (4) moving the seat fore and aft. Such a seat adjustment system causes confusion since there are four control motions for three degrees of freedom. As a result, vehicle occupants are easily frustrated by such motions for three degrees of freedom. As a result, vehicle occupants are easily frustrated by such events as when the control to raise the seat is exercised, the seat not only is raised but is also rotated. Occupants thus find it difficult to place the seat in the optimum location using this system and frequently give up trying leaving the seat in an improper driving position.

Many vehicles today are equipped with a lumbar support system which is never used by most occupants. One reason is that the lumbar support cannot be preset since the shape of the lumbar for different occupants differs significantly, i.e., a tall person has significantly different lumbar support requirements than a short person. Without knowledge of the size of the occupant, the lumbar support cannot be automatically adjusted.

As discussed in the above referenced copending patent application number (ATI-112), in approximately 95% of the cases where an occupant suffers a whiplash injury, the headrest is not properly located to protect him or her in a rear impact collision. Also, the stiffness and damping characteristics of a seat are fixed and no attempt is made in any production vehicle to adjust the stiffness and damping of the seat in relation to either the size or weight of an occupant, nor to the environmental conditions such as road roughness. All of these adjustments, if they are to be done automatically, require knowledge of the morphology of the seat occupant.

Systems are now being used to attempt to identify the vehicle occupant based on a coded key or other object carried by the occupant. This requires special sensors within the vehicle to recognize the coded object. Also, the system only works if the coded object is used by the particular person for whom the vehicle was programmed. If the vehicle is used by a son or daughter, for example, who use their mother's key then the wrong seat adjustments are made. Also, these systems preserve the choice of seat position without any regard for the correctness of the seat position. With the problems associated with the 4-way seats, it is unlikely that the occupant ever properly adjusts the seat. Therefore, the error will be repeated every time the occupant uses the vehicle.

Moreover, these coded systems are a crude attempt to identify the occupant. An improvement can be made if the morphological characteristics of the occupant can be measured as described below. Such measurements can be made of the height and weight, for example, and used not only to adjust the seat to a proper position but also to remember that position, as fine tuned by the occupant, for re-positioning the seat the next time the occupant occupies the seat. For the purposes herein, morphological characteristic will mean any measurable property of a human such as height, weight, leg or arm length, head diameter etc.

Once the morphological characteristics of a driver are determined by measuring his or her height and weight, other features can be incorporated into the system including, for example, the automatic adjustment of the rear view mirrors based on seat position and occupant height. In addition, a determination of an out-of-position occupant can be made and based thereon, airbag deployment suppressed if the occupant is more likely to the injured by the airbag than by the accident without the protection of the airbag. Furthermore, the characteristics of the airbag including the amount of gas produced by the inflator and the size of the airbag exit orifices can be adjusted to provide better protection for small light-weight occupants as well as large, heavy people. Even the direction of the airbag deployment can, in some cases, be controlled.

Still other features can now be adjusted based on the occupant morphology as well as the fact that the occupant can now be identified. Some of these features include the adjustment of seat armrest, cup holder, steering wheel (angle and telescoping), pedals, phone location and for that matter the adjustment of all things in the vehicle which a person must reach. Some items which depend on personal preferences can also the automatically adjusted including the radio station, temperature, ride and others.

Most, if not all, of the problems discussed above are difficult to solve or unsolvable using conventional technology.

OBJECTS AND SUMMARY OF THE INVENTION

It is an object of the present invention to provide a new and improved seat adjustment system which substantially solves the problems mentioned above.

It is another object of the present invention to provide a new and improved seat adjustment system using sensors to determine the approximate height of the occupant, measured from the seat bottom, along with a measurement of the occupant's weight to estimate his or her overall morphology and also to identify that occupant from among the usual drivers of the vehicle for recording other preferences of that occupant. In this manner, the problems discussed above, as well as many others, are alleviated by the automatic seat positioning system described below.

The present invention involves the measurement of one or more morphological characteristics of a vehicle occupant and the use of these measurements to classify the occupant as to size and weight, and then to use this classification to position the vehicle seat to a near optimum position for that class of occupant. Additional information concerning occupant preferences can also be associated with the occupant class so that when an person belonging to that particular class occupies the vehicle, the preferences associated with that class are implemented. These preferences include the seat location after it has been manually adjusted away from the position chosen initially by the system, the mirror location, temperature, radio station, steering wheel and steering column positions, etc. The preferred morphological characteristics used are the occupant height from the vehicle seat and weight of the occupant. The height is determined by sensors, usually ultrasonic, located in the headrest or another convenient location. The weight is determined by one of a variety of technologies which measure either pressure on or displacement of the vehicle seat or the force in the seat supporting structure.

Principal objects and advantages of this invention include:
1. To provide a system for passively and automatically adjusting the position of a vehicle seat to a near optimum location based on the size of an occupant.
2. To provide a system for recognizing a particular occupant of a vehicle and thereafter adjusting various features of the vehicle in accordance with the preferences of the recognized occupant.
3. To provide a system of approximately locating the eyes of a vehicle driver to thereby permit the placement of the driver's eyes at a particular location in the vehicle.
4. To provide a pattern recognition system to permit more accurate location of an occupant's head and the parts thereof.
5. To provide a method of determining whether a seat is occupied and, if not, leaving the seat at a neutral position.
6. To provide a system for automatically adjusting the position of various components of the vehicle to permit safer and more effective operation of the vehicle including the location of the pedals and steering wheel.
7. To determine whether an occupant is out-of-position relative to the airbag and if so, to suppress deployment of the airbag in a situation in which the airbag would otherwise be deployed.
8. To adjust the flow of gas into and out of the airbag based on the morphology and position of the occupant to improve the performance of the airbag in reducing occupant injury.
9. To provide a system where the morphological characteristics of an occupant are measured by sensors located within the seat.

Other objects and advantages of the present invention will become apparent from the following description of the preferred embodiments taken in conjunction with the accompanying drawings.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

The present invention is part of a series of inventions, some of which are disclosed above referenced U.S. patent applications, relating to the identification and monitoring of occupants and objects located within the passenger compartment of a vehicle, usually an automobile or light truck. The invention described and illustrated herein is primarily concerned with a system for automatically and passively adjusting the driver's seat of a vehicle based on the morphology of the driver. Obviously, the same system can be used for the passenger seat(s).

Such a system will at best be approximate since two people, even if they are identical in all other respects, may have a different preferred driving position. A system which automatically adjusts the seat, therefore, must learn from its errors. Thus, when a new occupant sits in the vehicle, the seat automatically estimates the best location of the seat for that occupant and moves the seat to that location. If the occupant changes the location, the system must remember that change and incorporate it into the adjustment the next time that person enters the vehicle and is seated in the same seat. Therefore, the system need not make a perfect selection the first time but it must remember the person and the position the seat was in for that person. The system, therefore, makes one, two or three measurements of characteristics of the occupant and then adjusts the seat based on an algorithm. The occupant will correct the adjustment and the next time that the system measures the same measurements for those measurement characteristics, it will set the seat to the corrected position.

The first characteristic used is a measurement of the height of the occupant from the vehicle seat. This can be done by a sensor in the ceiling of the vehicle but this becomes difficult since, even for the same seat location, the head of the occupant will not be at the same angle with respect to the seat and therefore the angle to a ceiling-mounted sensor is in general unknown at least as long as only one ceiling mounted sensor is used. This problem can be solved if two or three sensors are used as described in more detail below. The simplest implementation is to place the sensor in the seat. In U.S. patent application Ser. No. 08/476,882 filed simultaneously herewith; a rear impact occupant protection apparatus is disclosed which uses sensors mounted within the headrest. This same system can also be used to measure the height of the occupant from the seat and thus, for no additional cost assuming the rear impact occupant protection system described in the '882 application is provided, the first measure of the occupant's morphology can be achieved. For some applications, this may be sufficient since it is unlikely that two operators will use the vehicle who have the same height. For other implementations, one or more additional measurements are used.

Figure 1:
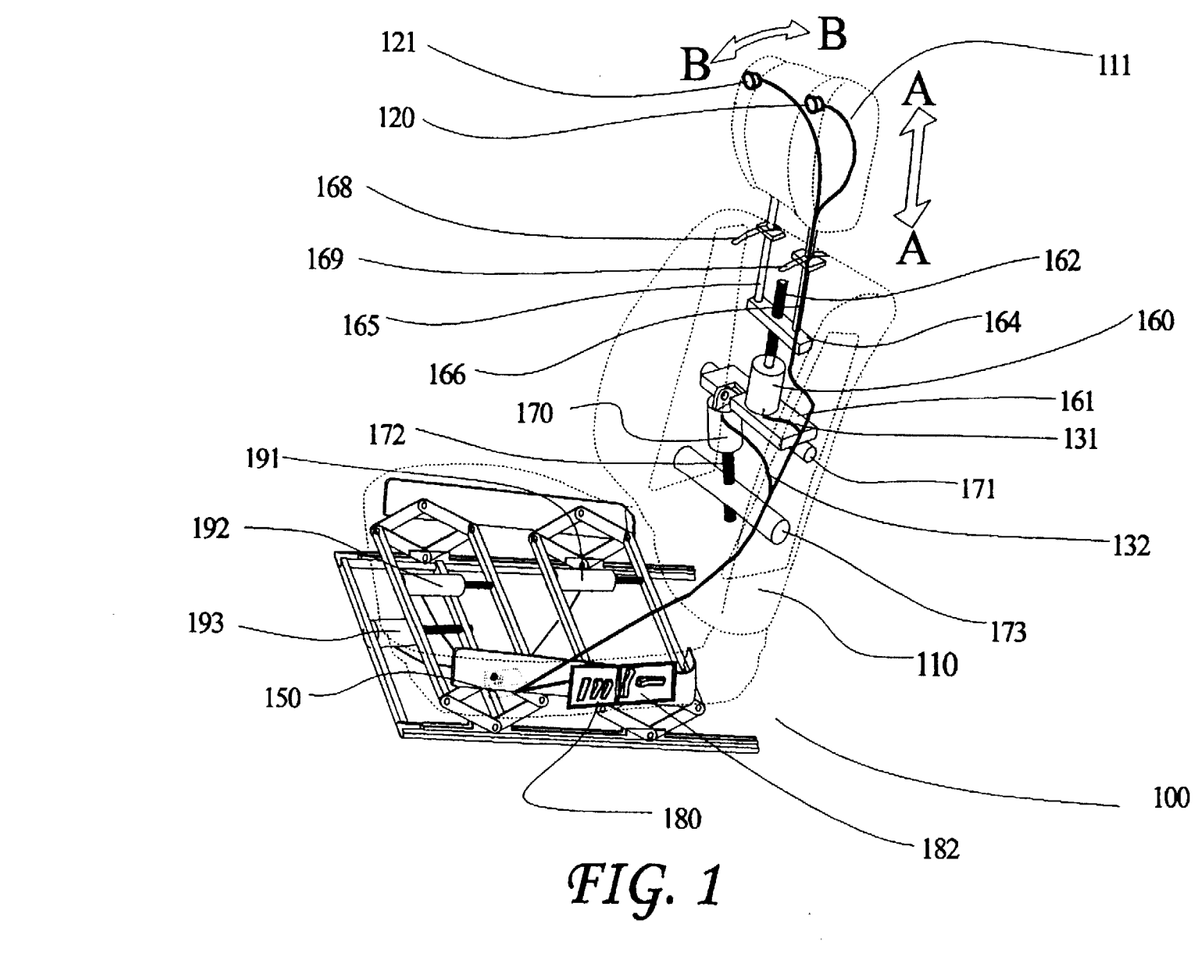
FIG. 1 is a perspective view of an automatic seat adjustment system, with the seat shown in phantom, with a movable headrest and sensors for measuring the height of the occupant from the vehicle seat showing motors for moving the seat and a control circuit connected to the sensors and motors.

Referring now to FIG. 1, an automatic seat adjustment system is shown generally at 100 with a movable headrest 111 and ultrasonic sensor 120 and ultrasonic receiver 121 for measuring the height of the occupant of the seat. Motors 191, 192, and 193 connected to the seat for moving the seat, a control circuit or module 150 connected to the motors and a headrest actuation mechanism using motors 160 and 170, which may be servo-motors, are also illustrated. The seat 110 and headrest 111 are shown in phantom. Vertical motion of the headrest 111 is accomplished when a signal is sent from control module 150 to servo motor 160 through a wire 131. Servo motor 160 rotates lead screw 162 which engages with a threaded hole in member 164 causing it to move up or down depending on the direction of rotation of the lead screw 162. Headrest support rods 165 and 166 are attached to member 164 and cause the headrest 111 to translate up or down with member 164. In this manner, the vertical position of the headrest can be controlled as depicted by arrow A—A.

Wire 132 leads from control module 150 to servo motor 170 which rotates lead screw 172. Lead screw 172 engages with a threaded hole in shaft 173 which is attached to supporting structures within the seat shown in phantom. The rotation of lead screw 172 rotates servo motor support 161, upon which servo-motor 160 is situated, which in turn rotates headrest support rods 165 and 166 in slots 168 and 169 in the seat 110. Rotation of the servo motor support 161 is facilitated by a rod 171 upon which the servo motor support 161 is positioned. In this manner, the headrest 111 is caused to move in the fore and aft direction as depicted by arrow B—B. Naturally there are other designs which accomplish the same effect in moving the headrest up and down and fore and aft.

The operation of the system is as follows. When an occupant is seated on a seat containing the headrest and control system described above, the ultrasonic transmitter 120 emits ultrasonic energy which reflects off of the head of the occupant and is received by receiver 121. An electronic circuit in control module 150 contains a microprocessor which determines the distance from the head of the occupant based on the time between the transmission and reception of an ultrasonic pulse. The headrest 111 moves up and down until it finds the top of the head and then the vertical position closest to the head of the occupant and then remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in this longitudinal measurement.

When an occupant sits on seat 110, the headrest 111 moves to find the top of the occupant's head as discussed above. This is accomplished using an algorithm and a microprocessor which is part of control circuit 150. The headrest 111 then moves to the optimum location for rear impact protection as described in the above referenced patent application (ATI-112). Once the height of the occupant has been measured, another algorithm in the microprocessor in control circuit 150 compares the occupant's measured height with a table representing the population as a whole and from this table, the appropriate positions for the seat corresponding to the occupant's height is selected. For example, if the occupant measured 33 inches from the top of the seat bottom, this might correspond to a 85% human, depending on the particular seat and statistical tables of human measurements.

Careful study of each particular vehicle model provides the data for the table of the location of the seat to properly position the eyes of the occupant within the "eye-ellipse", the steering wheel within a comfortable reach of the occupant's hands and the pedals within a comfortable reach of the occupant's feet, based on his or her size.

Once the proper position has been determined by control circuit 150, signals are sent to motors 191, 192, and 193 to move the seat to that position. If during some set time period after the seat has been positioned, the operator changes these adjustments, the new positions of the seat are stored in association with an occupant height class in a second table within control circuit 150. When the occupant again occupies the seat and his or her height has once again been determined, the control circuit will find an entry in the second table which takes precedence over the basic, original table and the seat returns to the adjusted position. When the occupant leaves the vehicle, or even when the engine is shut off and the door opened, the seat can be returned to a neutral position which provides for easy entry and exit from the vehicle.

The seat 110 also contains two control switch assemblies 180 and 182 for manually controlling the position of the seat 110 and headrest 111. The seat control switches 180 permit the occupant to adjust the position of the seat if he or she is dissatisfied with the position selected by the algorithm. The headrest control switches 182 permit the occupant to adjust the position of the headrest in the event that the calculated position is uncomfortably close to or far from the occupant's head. A woman with a large hairdo might find that the headrest automatically adjusts so as to contact her hairdo. This adjustment she might find annoying and could then position the headrest further from her head. For those vehicles which have a seat memory system for associating the seat position with a particular occupant, which has been assumed above, the position of the headrest relative to the occupant's head could also be recorded. Later, when the occupant enters the vehicle, and the seat automatically adjusts to the recorded preference, the headrest will similarly automatically adjust.

Figure 2:
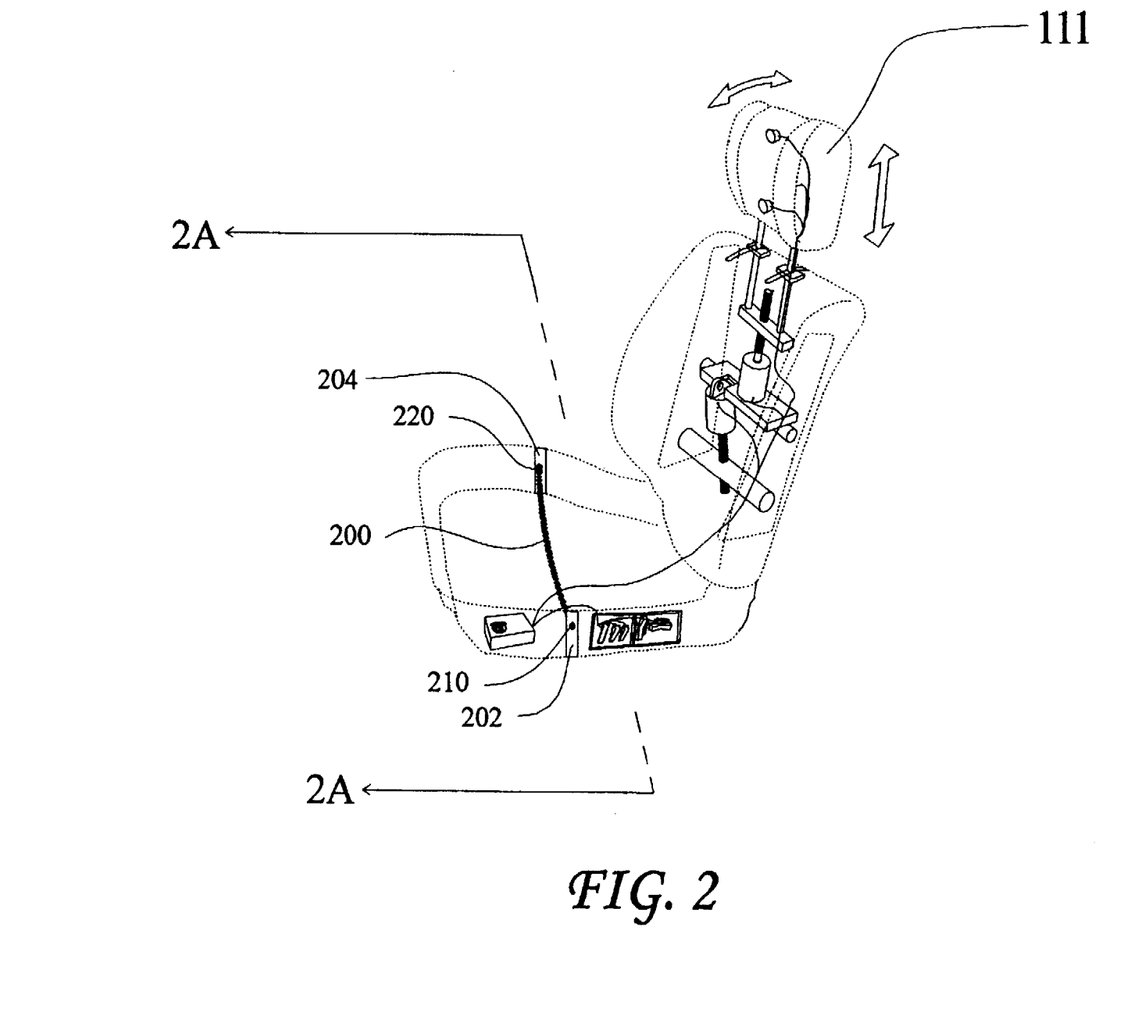
FIG. 2 is a perspective view of the seat shown in FIG. 1 with the addition of a weight sensor shown mounted onto the seat.
Figure 2A:
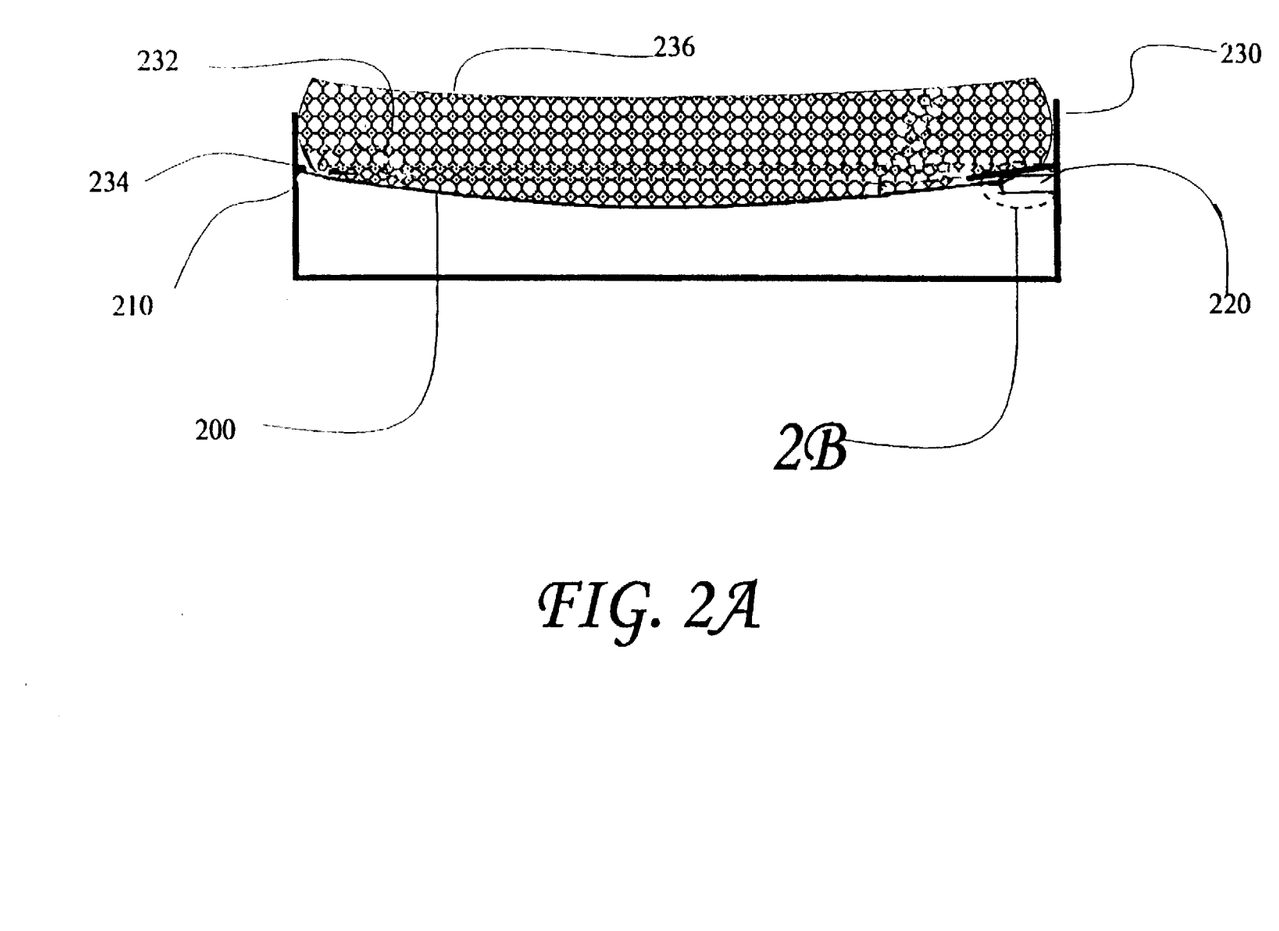
FIG. 2A is a view taken along line 2A—2A in FIG. 2.

The height of the occupant, although probably the best initial morphological characteristic, may not be sufficient especially for distinguishing one driver from another when they are approximately the same height. A second characteristic, the occupant's weight, can also be readily determined from sensors mounted within the seat in a variety of ways as shown in FIG. 2 which is a perspective view of the seat shown in FIG. 1 with a displacement or weight sensor 200 shown mounted onto the seat. Displacement sensor 200 is supported from supports 202 and 204. Referring now to FIG. 2A, which is a view of the apparatus of FIG. 2 taken along line 2A—2A, seat 230 is constructed from a foam layer 232 which is supported by a spring system 234 which is in contract with the displacement sensor 200. The displacement sensor 200 comprises an elongate cable 205 retained at one end by support 210 and a displacement sensor 220 situated at an opposite end. This displacement sensor 220 can be any of a variety of such devices including, but not limited to, a linear rheostat, a linear variable differential transformer (LVDT), a linear variable capacitor, or any other length measuring device. Alternately, the cable can be replaced with a spring and the tension in the spring measured using a strain gage or other force measuring device or the strain in the seat support structure can be measured by appropriately placing strain gages on one or more of the seat supports. One seat design is illustrated in FIG. 2. Similar weight measurement systems can be designed for other seat designs. Also, some products are available which can approximately measure weight based on pressure measurements made at or near the upper seat surface 236. It should be noted that the weight measured here will not be the entire weight of the occupant since some of the occupant's weight will be supported by his or her feet which are resting on the floor or pedals.

Figure 2B:
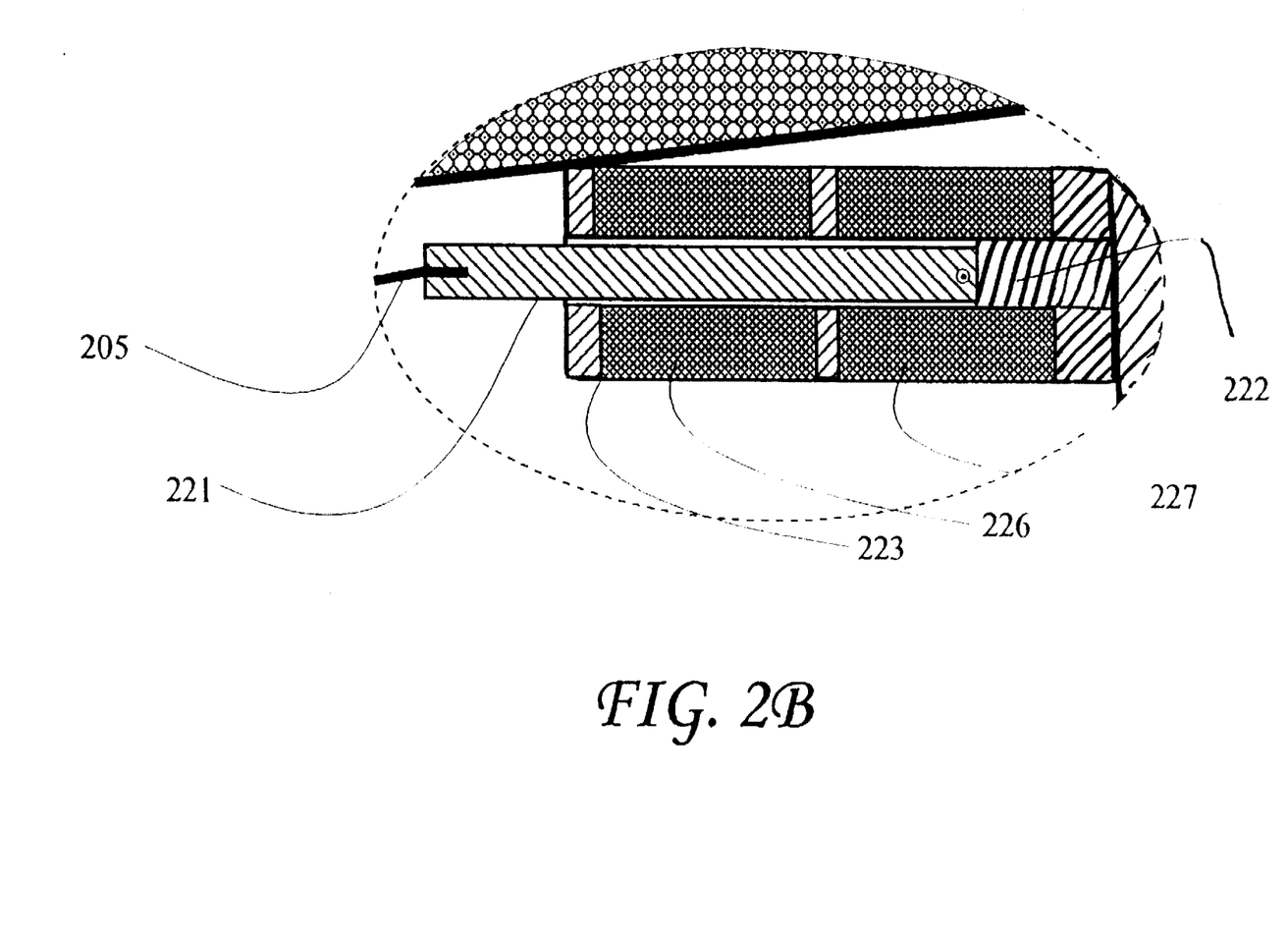
FIG. 2B is an enlarged view of the section designated 2B in FIG. 2A.

As weight is placed on the seat surface 236, it is supported by spring 234 which deflects downward causing cable 205 of the sensor 200 to begin to stretch axially. Using a LVDT as an example of length measuring device 220, the cable 205 pulls on rod 221 tending to remove rod 221 from cylinder 223. The movement of rod 221 out of cylinder 223 (FIG. 2B) is resisted by a spring 222 which returns the rod 221 into the cylinder 223 when the weight is removed from the seat surface 236. The amount which the rod 221 is removed from the cylinder 223 is measured by the amount of coupling between the windings 226 and 227 of the transformer as is well understood by those skilled in the art. LVDT's are commercially available devices. In this matter, the deflection of the seat can be measured which is a measurement of the weight on the seat. The exact relationship between weight and LVDT output is generally determined experimentally for this application.

By use of a combination of weight and height, the driver of the vehicle can in general be positively identified among the class of drivers who operate the vehicle. Thus, when a particular driver first uses the vehicle, the seat will be automatically adjusted to the proper position. If the driver changes that position within a prescribed time period, the new seat position will be stored in the second table for the particular driver's height and weight. When the driver reenters the vehicle and his or her height and weight are again measured, the seat will go to the location specified in the second table if one exists. Otherwise the location specified in the first table will be used.

This system provides an identification of the driver based on two morphological characteristics which is adequate for most cases. As additional features of the vehicle interior identification and monitoring system described in the above referenced patent applications are implemented, it will be possible to obtain additional morphological measurements of the driver which will provide even greater accuracy in driver identification. Two characteristics may not be sufficient to rely on for theft and security purposes, however, many other driver preferences can still be added to seat position with this level of occupant recognition accuracy. These include the automatic selection of a preferred radio station, vehicle temperature, steering wheel and steering column position, etc.

One advantage of using only the height and weight is that it avoids the necessity of the seat manufacturer from having to interact with the headliner manufacturer, or other component suppliers, since all of the measuring transducers are in the seat. This two characteristic system is generally sufficient to distinguish drivers that normally drive a particular vehicle. This system costs little more than the memory systems now in use and is passive, i.e., it does not require action on the part of the occupant after his initial adjustment has been made.

Figure 3:
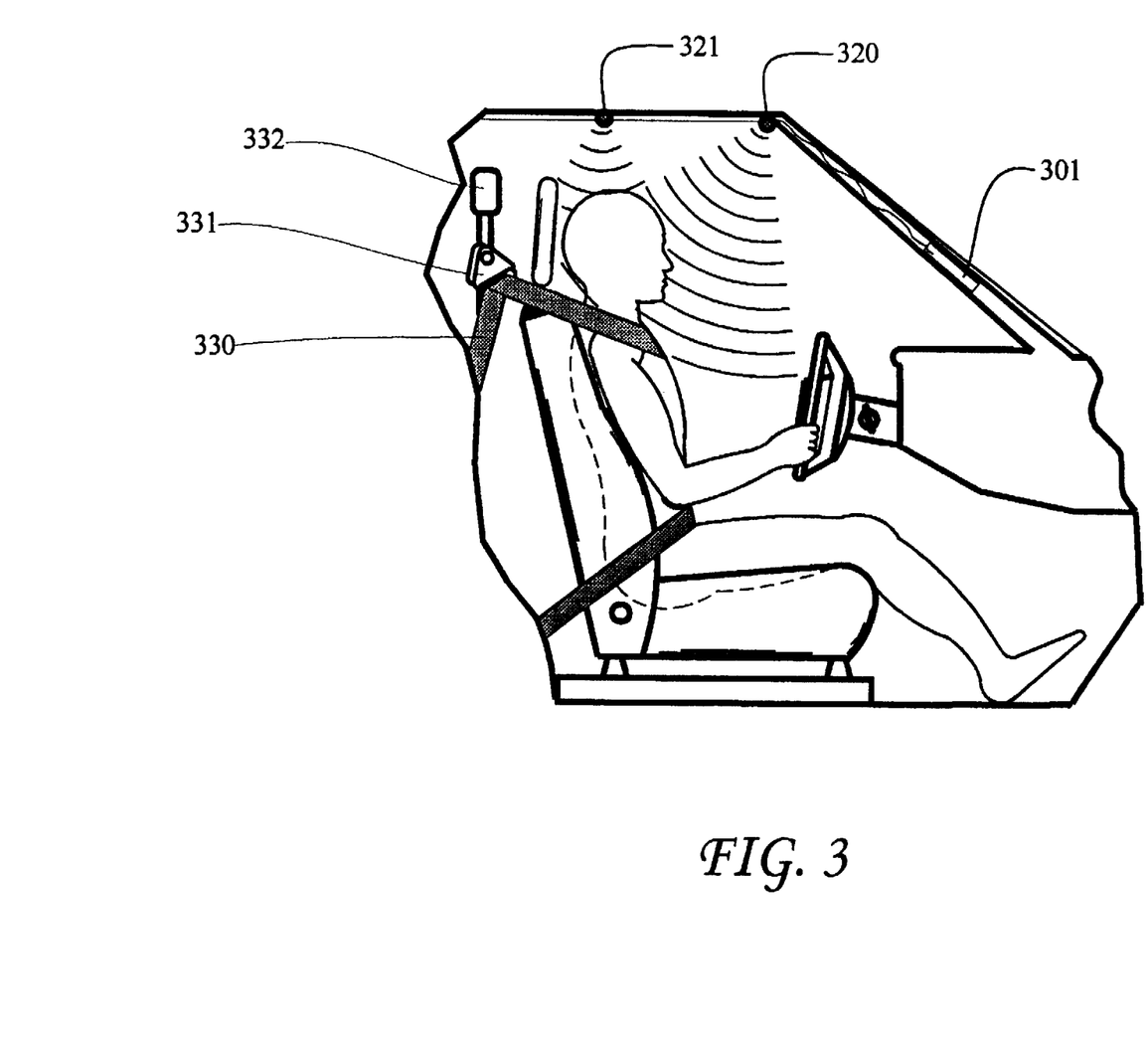
FIG. 3 is a side plan view of the interior of an automobile, with portions cut away and removed, with two occupant height measuring sensors, one mounted into the headliner above the occupant's head and the other mounted onto the A-pillar and also showing a seatbelt associated with the seat wherein the seatbelt has an adjustable upper anchorage point which is automatically adjusted based on the height of the occupant.

Naturally, there are other methods measuring the height of the driver such as placing the transducers at other locations in the vehicle. Some alternatives are shown in FIG. 3 which is a side plan view wherein two height measuring sensors 320, 321 are shown, sensor 320 being mounted into the headliner above the occupant's head and the other sensor 320 being mounted onto the A-pillar. A sensor as used herein is the combination of two transducers (a transmitter and a receiver) or one transducer which can both transmit and receive. The headliner is the trim which provides the interior surface to the roof of the vehicle and the A-pillar is the roof supporting member which is on either side of the windshield and on which the front doors are hinged. These transducers may already be present because of other implementations of the vehicle interior identification and monitoring system described in the above referenced patent applications. In this case, the use of both transducers provides a more accurate determination of location of the head of the driver. Using transducer 321 alone, the exact position of the head is ambiguous since the transducer measures the distance to the head regardless of what direction the head is. By knowing the distance from the head to transducer 320, the ambiguity is substantially reduced. This argument is of course dependent on the use of ultrasonic transducers. Optical transducers using CCD arrays are now becoming price competitive and, as pointed out in the above referenced patent applications, will be the technology of choice for interior vehicle monitoring. A single CCD array of 160 by 160 pixels, for example, coupled with the appropriate pattern recognition software, can be used to form an image of the head of an occupant and accurately locate the head for the purposes of this invention.

FIG. 3 also illustrates a system where the seatbelt 330 has an adjustable upper anchorage point 331 which is automatically adjusted by a motor 332 to a location optimized based on the height of the occupant. The calculations for this feature and the appropriate control circuitry can also be located in control module 301 or elsewhere if appropriate.

Figure 4:
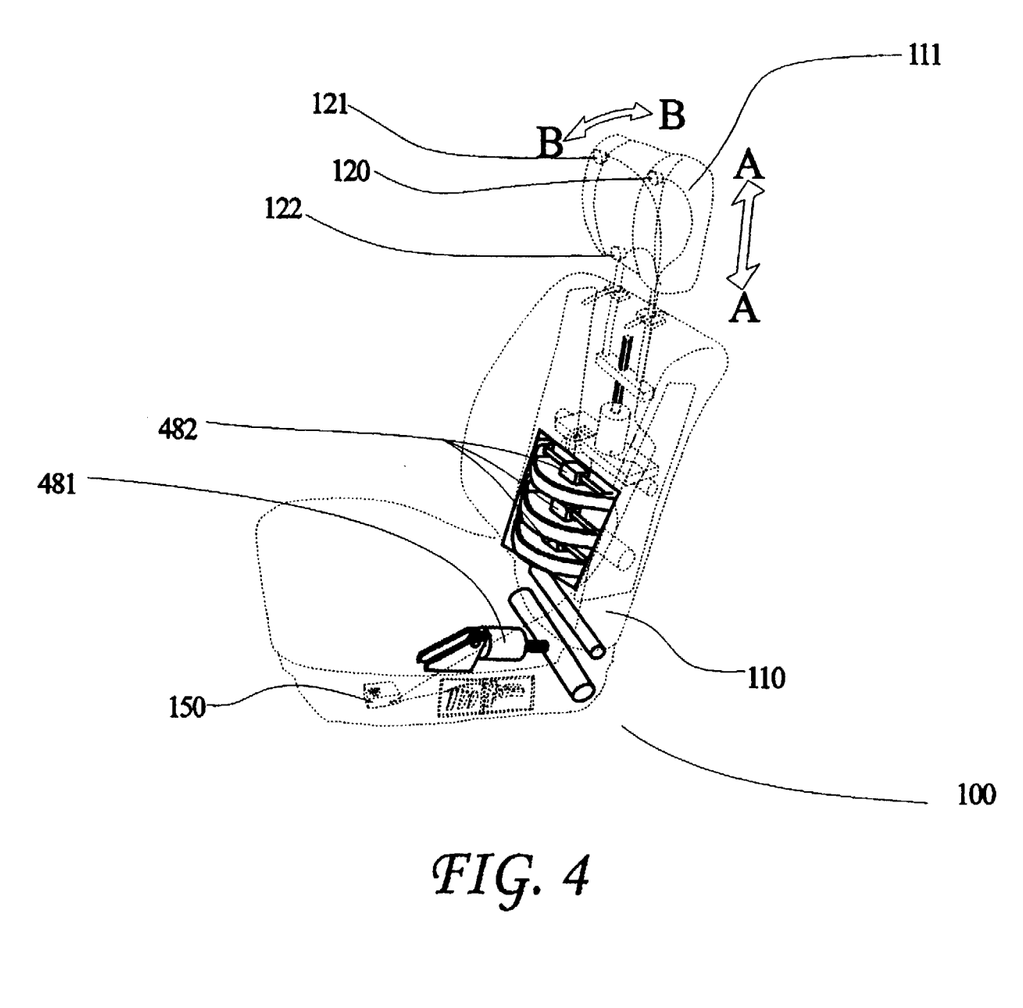
FIG. 4 is a view of the seat of FIG. 1 showing motors for changing the tilt of seat back and the lumbar support.

Many luxury automobiles today have the ability to control the angle of the seat back as well as a lumbar support. These additional motions of the seat can also be controlled by the seat adjustment system in accordance with the invention. FIG. 4 is a view of the seat of FIG. 1 showing motors 481 and 482 for changing the tilt of the seat back and the lumbar support. Three motors 482 are used to adjust the lumbar support in this implementation. The same procedure is used for these additional motions as described for FIG. 1 above.

An initial table is provided based on the optimum positions for various segments of the population. For example, for some applications the table may contain a setting value for each five percentile of the population for each of the 6 possible seat motions, fore and aft, up and down, total seat tilt, seat back angle, lumbar position, and headrest position for a total of 120 table entries. The second table similarly would contain the personal preference modified values of the 6 positions desired by a particular driver.

In FIG. 1, the ultrasonic transducers 120 and 121 were described as one being a transmitter and the other being a receiver. For some applications, it is desirable to use both transducers as both transducers and receivers. Similarly, a third combination transmitter and receiver 122 may also be utilized as shown in FIG. 4. This arrangement permits many of the advantages of a phased array system to be achieved.

The resolution of a transducer is proportional to the ratio of the wave length to the diameter of the transmitter. Once three transmitters and receivers are used, the equivalent single transmitter and receiver is one which has a diameter approximately equal to the shortest distance between any pair of transducers. In this case, the equivalent diameter is equal to the distance between transmitter 120 or 121 and 122. This provides far greater resolution and, by controlling the phase between signals sent by the transmitters, the direction of the equivalent ultrasonic beam can be controlled. Thus, the head of the driver can be scanned with great accuracy and a map made of the occupant's head. Using this technology plus an appropriate pattern recognition algorithm, such as a neural network, an accurate location of the driver's head can be found even when the driver's head is partially obscured by a hat, coat, or hairdo. This also provides at least one other identification morphological characteristic which can be used to further identify the occupant, namely the diameter of the driver's head.

With a knowledge of the weight of an occupant, additional improvements can be made to automobile and truck seat designs. In particular, the stiffness of the seat can be adjusted so as to provide the same level of comfort for light and for heavy occupants. The damping of occupant motions, which heretofore has been largely neglected, can also be readily adjusted as shown on FIG. 5 which is a view of the seat of FIG. 1 showing one of several possible arrangements for changing the stiffness and the damping of the seat. In the seat bottom 520, there is a container 515, the conventional foam and spring design has been replaced by an inflated rectangular container very much like an air mattress which contains a cylindrical inner container 518 which is filled with an open cell urethane foam. An adjustable orifice 525 connects the two container 515,518 so that air can flow in a controlled manner therebetween. The amount of opening of orifice 525 is controlled by control circuit 150. A small air compressor 555 controls the pressure in container 515 under control of the control circuit 150. A pressure transducer 560 monitors the pressure within container 515 and inputs this information into control circuit 150.

Figure 5:
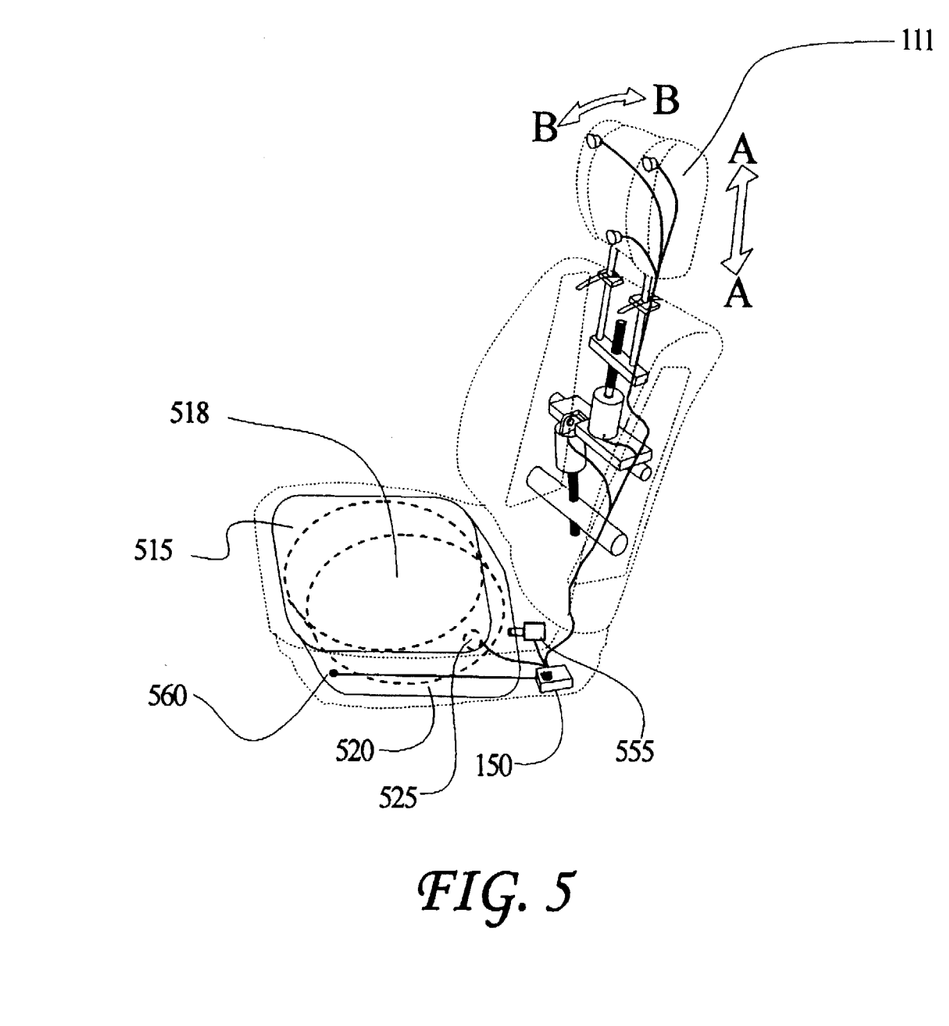
FIG. 5 is a view of the seat of FIG. 1 showing a system for changing the stiffness and the damping of the seat.

The operation of the system is as follows. When an occupant sits on the seat, pressure initially builds up in the seat container 515 which gives an accurate measurement of the weight of the occupant. Control circuit 150, using an algorithm and a microprocessor, then determines an appropriate stiffness for the seat and adds pressure to achieve that stiffness. The pressure equalizes between the two containers 515 and 518 through the flow of air through orifice 525. Control circuit 150 also determines an appropriate damping for the occupant and adjusts the orifice 525 to achieve that damping. As the vehicle travels down the road and the road roughness causes the seat to move up and down, the inertial force on the seat by the occupant causes the air pressure to rise and fall in container 518 and also, but, much less so, in container 515 since the occupant sits mainly above container 518 and container 515 is much larger than container 518. The major deflection in the seat takes place first in container 518 which pressurizes and transfers air to container 515 through orifice 525. The size of the orifice opening determines the flow rate between the two containers and therefore the damping of the motion of the occupant. Since this opening is controlled by control circuit 150, the amount of damping can thereby also be controlled. Thus, in this simple structure, both the stiffness and damping can be controlled to optimize the seat for a particular driver. Naturally, if the driver does not like the settings made by control circuit 150, he or she can change them to provide a stiffer or softer ride.

The stiffness of a seat is the change in force divided by the change in deflection. This is important for many reasons, one of which is that it controls the natural vibration frequency of the seat occupant combination. It is important that this be different from the frequency of vibrations which are transmitted to the seat from the vehicle in order to minimize the up and down motions of the occupant. The damping is a force which opposes the motion of the occupant and which is dependent on the velocity of relative motion between the occupant and the seat bottom. It thus removes energy and minimizes the oscillatory motion of the occupant. These factors are especially important in trucks where the vibratory motions of the driver's seat, and thus the driver, have caused many serious back injuries among truck drivers.

Figure 6:
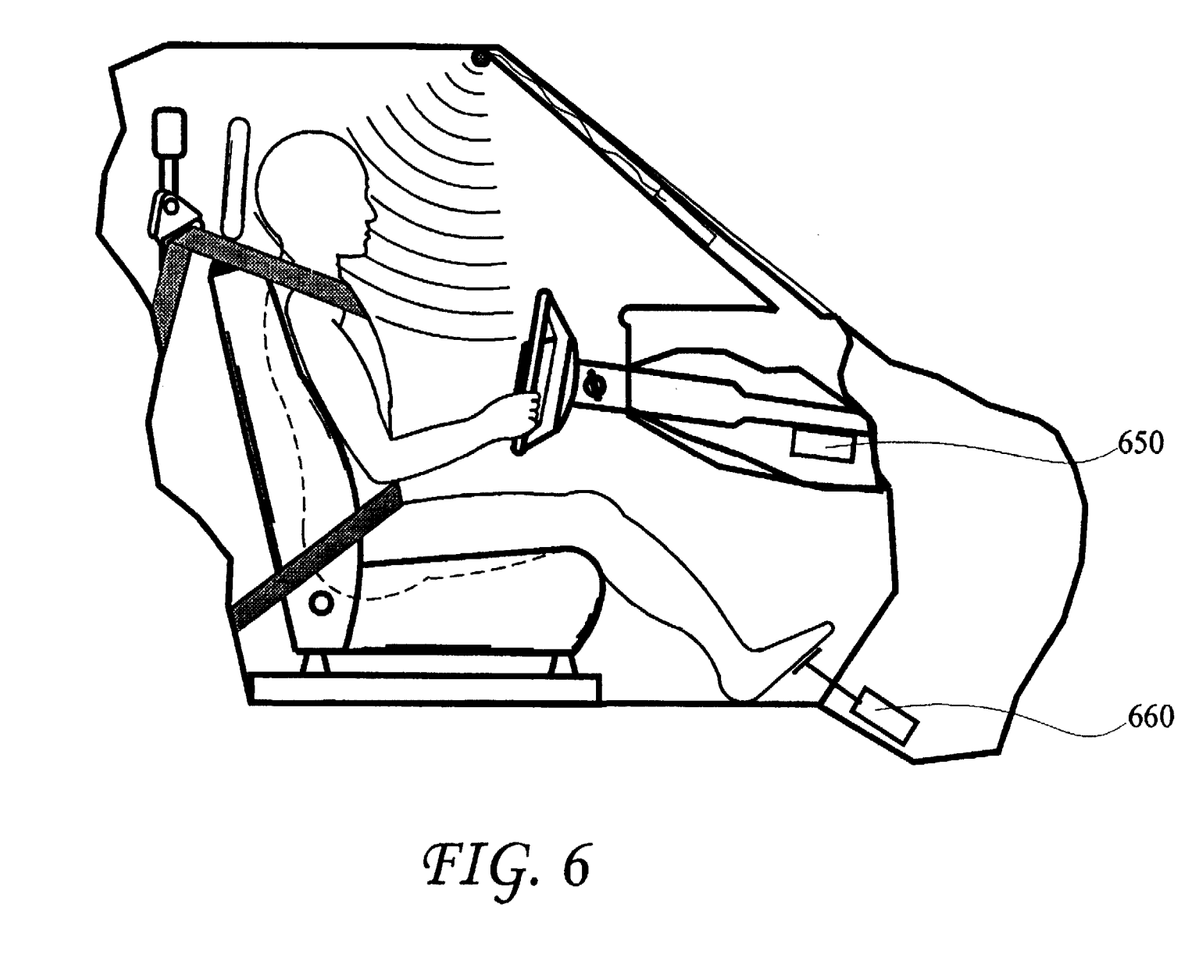
FIG. 6 is a view as in FIG. 3 showing a driver and driver seat with an automatically adjustable steering column and pedal system which is adjusted based on the morphology of the driver.

In an automobile, there is an approximately fixed vertical distance between the optimum location of the occupants eyes and the location of the pedals. The distant from a driver's eyes to his or her feet, on the other hand, is not the same for all people. An individual driver now compensates for this discrepancy by moving the seat and by changing the angle between his or hers legs and body. For both small and large drivers, this discrepancy cannot be fully compensated for and as a result, their eyes are not appropriately placed. A similar problem exists with the steering wheel. To help correct these problems, the pedals and steering column should be movable as illustrated in FIG. 6 which is a plan view similar to that of FIG. 3 showing a driver and driver seat with an automatically adjustable steering column and pedal system which is adjusted based on the morphology of the driver. In FIG. 6, a motor 650 is connected to and controls the position of the steering column and another motor 660 is connected to and controls the position of the pedals. Both motors 660,661 are coupled to and controlled by control circuit 150 wherein now the basic table of settings includes values for both the pedals and steering column locations.

Figure 7:
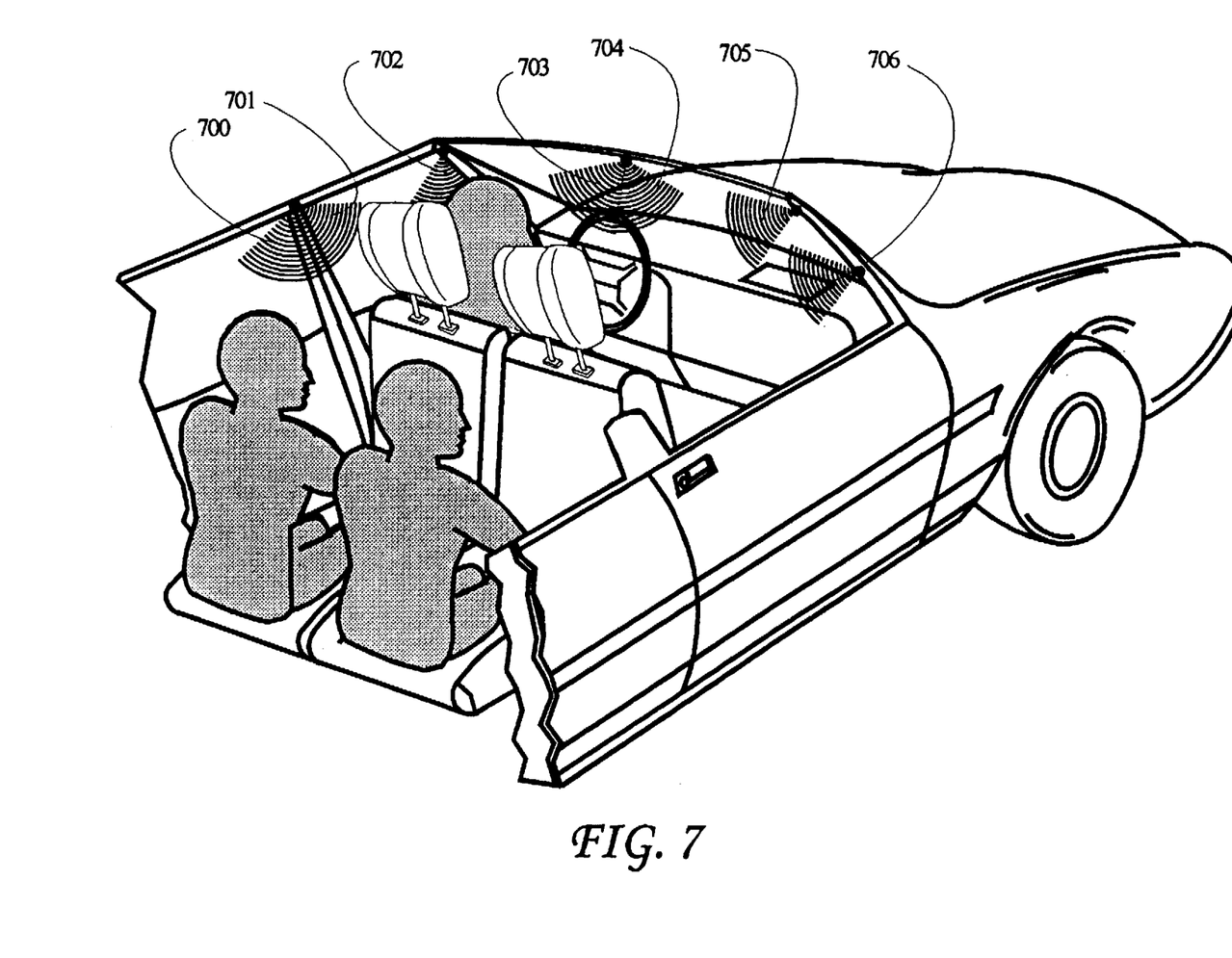
FIG. 7 is a perspective view of the interior of the passenger compartment of an automobile, with parts cut away and removed, showing a variety of transmitters which can be used in a phased array system.

As various parts of the vehicle interior identification and monitoring system described in the above reference patent applications are implemented, a variety of transmitting and receiving transducers will be present in the vehicle passenger compartment. If several of these transducers are ultrasonic transmitters and receivers, they can be operated in a phased array manner, as described above for the headrest, to permit precise distance measurements and mapping of the components of the passenger compartment. This is illustrated in FIG. 7 which is a perspective view of the interior of the passenger compartment showing a variety of transmitters and receivers, 700–706 which can be used in a phased array system. In addition, information can be transmitted between the transducers using coded signals in a ultrasonic network through the vehicle compartment airspace. If one of these sensors is an optical CCD array, the location of the driver's eyes can be accurately determined and the results sent to the seat ultrasonically. Obviously, many other possibilities exist.

Figure 8:
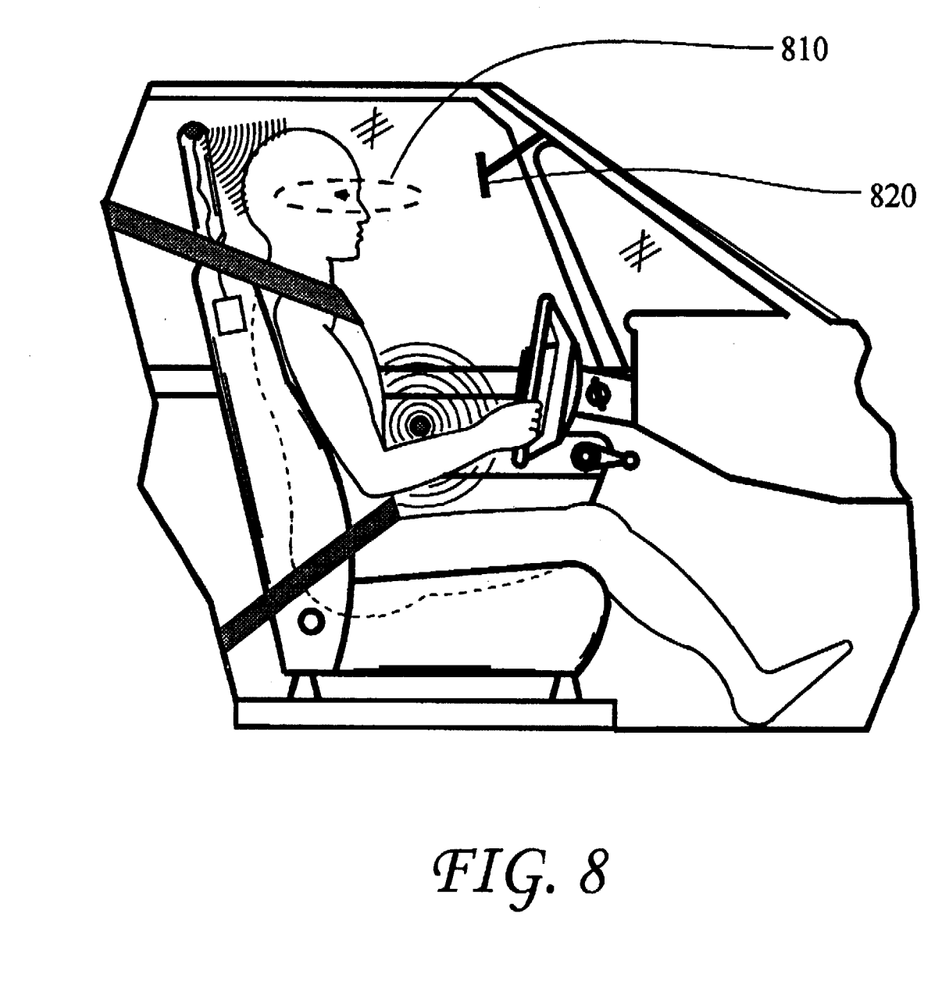
FIG. 8 is a view similar to FIG. 1 showing the occupant's eyes and the seat adjusted to place the eyes at a particular vertical position for proper viewing through the windshield and rear view mirror.

The eye ellipse discussed above is illustrated at 810 in FIG. 8, which is a view similar to FIG. 1, showing the occupant's eyes and the seat adjusted to place the eyes at a particular vertical position for proper viewing through the windshield and rear view mirror. Many systems are now under development to improve vehicle safety and driving ease. For example, right vision systems are being tested which project an enhanced image of the road ahead of the vehicle onto the windshield in a "heads-up display". The main problem with the systems now being tested is that the projected image does not precisely overlap the image as seen through the windshield. This parallax causes confusion in the driver and can only be corrected if the location of the driver's eyes is accurately known. One method of solving this problem is to use the passive seat adjustment system described herein to place the occupant's eyes at the optimum location as described above. Once this has been accomplished, in addition to solving the parallax problem, the eyes are properly located with respect to the rear view mirror 820 and little if any adjustment is required in order for the driver to have the proper view of what is behind the vehicle.

Figure 9:
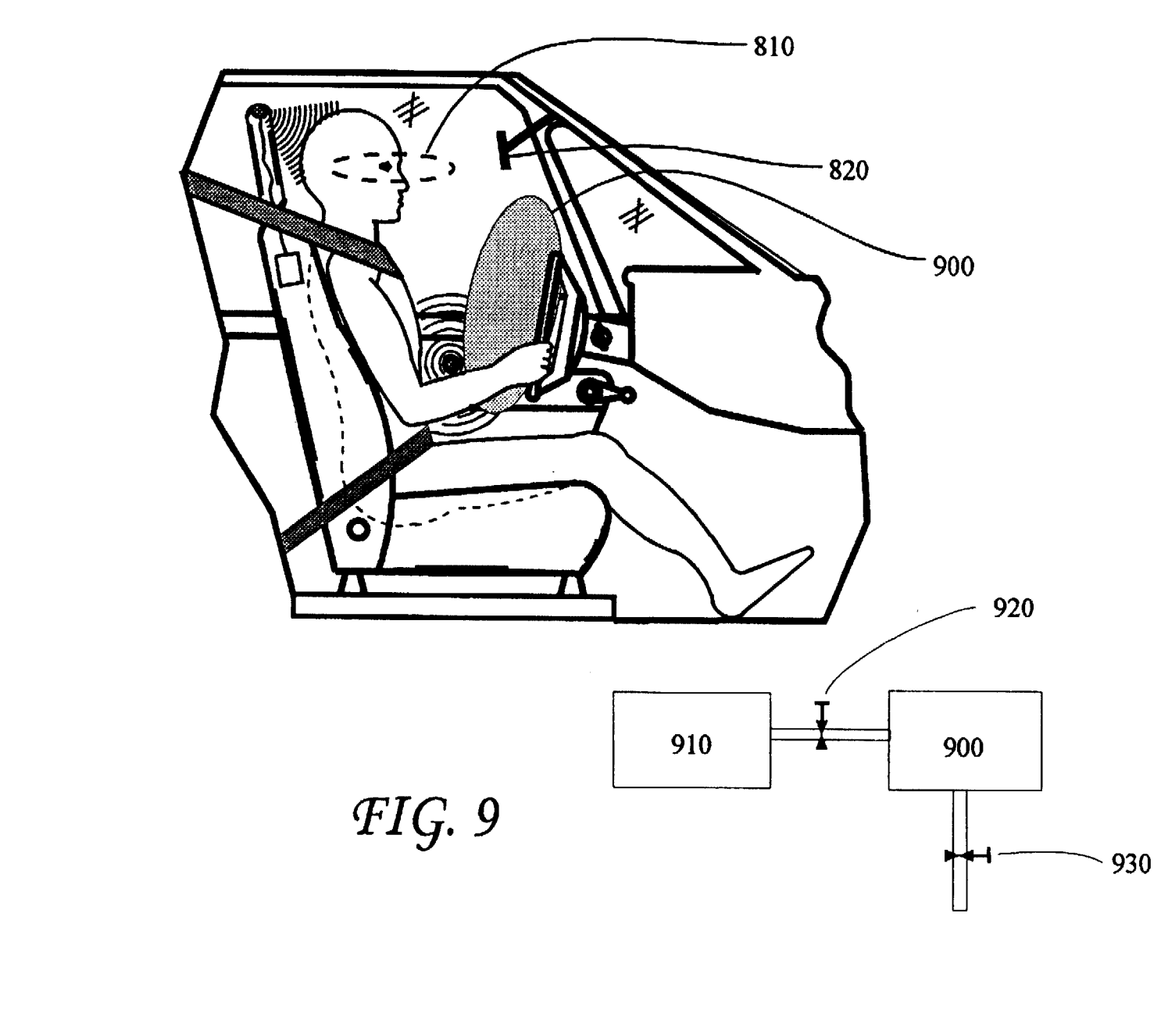
FIG. 9 is a view similar to FIG. 1 showing an inflated airbag and an arrangement for controlling both the flow of gas into and the flow of gas out of the airbag during the crash where the determination is made based on a height sensor located in the headrest and a weight sensor in the seat.

Several systems are in development for determining the location of an occupant and modifying the deployment of the airbag based of his or her position. These systems are called "smart airbags". The passive seat control system in accordance with this invention can also be used for this purpose as illustrated in FIG. 9. This figure is a view similar to FIG. 1 showing an inflated airbag 900 and an arrangement for controlling both the flow of gas into and out of the airbag during a crash. The determination is made based on height sensors 120, 121 and 122 located in the headrest, a weight sensor 200 in the seat and the location of the seat which is known by control circuit 150 (See, FIGS. 1, 2 and 2A). Other smart airbags systems rely only on the position of the occupant determined from various position sensors using ultrasonics or optical sensors.

The weight sensor coupled with the height sensor and the occupant's velocity relative to the vehicle, as determined by the occupant position sensors, provides information as to the amount of energy which the airbag will need to absorb during the impact of the occupant with the airbag. This, along with the location of the occupant relative to the airbag, is then used to determine the amount of gas which is to be injected into the airbag during deployment and the size of the exit orifices which control the rate of energy dissipation as the occupant is interacting with the airbag during the crash. For example, if an occupant is particularly heavy then it is desirable to increase the amount of gas, and thus the initial pressure, in the airbag to accommodate the larger force which will be required to arrest the relative motion of the occupant. Also, the size of the exit orifices should be reduced, since there will be a larger pressure tending to force the gas out of the orifices, in order to prevent the bag from bottoming out before the occupant's relative velocity is arrested. Similarly, for a small occupant the initial pressure would be reduced and the size of the exit orifices increased. If, on the other hand, the occupant is already close to the airbag then the amount of gas injected into the airbag needs to be reduced.

There are many ways of varying the amount of gas injected into the airbag some of which are covered in the patent literature and include, for example, inflators where the amount of gas generated and the rate of generation is controllable. For example, in a particular hybrid inflator manufactured by the Allied Signal Corporation, two pyrotechnic charges are available to heat the stored gas in the inflator. Either or both of the pyrotechnic charges can be ignited and the timing between the ignitions can be controlled to significantly vary the rate of gas flow to the airbag.

The flow of gas out of the airbag is traditionally done through fixed diameter orifices placed in the bag fabric. Some attempts have been made to provide a measure of control through such measures as blow-out patches applied to the exterior of the airbag. Other systems were disclosed in U.S. patent application Ser. No. 07/541,464 filed Feb. 9, 1989, now abandoned. FIG. 9A illustrates schematically an inflator 910 generating gas to fill airbag 900 through control valve 920. The flow of gas out of airbag 900 is controlled by exit control valve 930. The valve 930 can be implemented in many different ways including, for example, a motor operated valve located adjacent the inflator and in fluid communication with the airbag. When control circuit 150 determines the size and weight of the occupant, the seat position and the relative velocity of the occupant, it then determines the appropriate opening for the exit valve 930, which is coupled to the control circuit 150. A signal is then sent from control circuit 150 to the motor controlling this valve which provides the proper opening.

In a like manner, other parameters can also be adjusted, such as the direction of the airbag, by properly positioning the angle and location of the steering wheel relative to the driver. If seatbelt pretensioners are used, the amount of tension in the seatbelt or the force at which the seatbelt spools out, for the case of force limiters, could also be adjusted based on the occupant morphological characteristics determined by the system of this invention.

Once the morphology of the driver and the seat position is known, many other objects in the vehicle can be automatically adjusted to conform to the occupant. An automatically adjustable seat armrest, a cup holder, the cellular phone, or any other objects with which the driver interacts can be now moved to accommodate the driver. This is in addition to the personal preference items such as the radio station, temperature, etc. discussed above.

Once the system of this invention is implemented, additional features become possible such as a seat which automatically makes slight adjustments to help alleviate fatigue or to account for a change of position of the driver in the seat, or a seat which automatically changes position slightly based on the time of day. Many people prefer to sit more upright when driving at night, for example. Other similar improvements based on a knowledge of the occupant morphology will now become obvious to those skilled in the art.

Although several preferred embodiments are illustrated and described above, there are other possible combinations using different sensors which measure either the same or different morphological characteristics, such as knee position, of an occupant to accomplish the same or similar goals as those described herein. There are also numerous additional applications in addition to those described above. This invention is not limited to the above embodiments and should be determined by the following claims.

What is claimed is:

1. In a motor vehicle having a passenger compartment with interior surfaces, a seat on which an occupant sits, said compartment further having an airbag system with at least one deployable airbag mounted within said passenger compartment positioned to deploy between said occupant and said surfaces in the event of a crash of said vehicle, said airbag system having first control means for controlling the flow of gas into said airbag, a control system for said airbag system based on a morphological characteristic of said occupant comprising:

(a) measurement means mounted in association with said seat for measuring at least one morphological characteristic of the occupant, said measurement means generating a first signal representative of said at least one measured morphological characteristic;

(b) a processor comprising computational means for determining the desired flow of gas out of said airbag after initial inflation of said airbag for the occupant based on said at least one measured morphological characteristic, said processor providing a second signal representative of the desired flow of gas out of said airbag for the occupant;

(c) first input means coupled to said measurement means and said processor for inputting said first signal into said processor;

(d) second control means for controlling the flow of gas out of said airbag after initial inflation of said airbag; and (e) second input means coupled to said processor and said second control means for inputting said second signal into said second control means such that said second control means controls said gas flow out of said airbag based on said at least one measured morphological characteristic.

2. The system in accordance with claim 1, wherein said first control means for controlling the flow of gas into said airbag comprises a variable inflation rate inflator.

3. The system in accordance with claim 1, wherein said second control means for controlling the flow of gas out of said airbag are separate from said first control means and comprises a variable flow restrictor.

4. The system in accordance with claim 1, wherein said vehicle seat has a horizontal surface on which the occupant is sitting and said at least one morphological characteristic is the height of the occupant measured from said horizontal surface.

5. The system in accordance with claim 1, wherein said at least one morphological characteristic is the weight of the occupant.

6. The system in accordance with claim 1, further comprising additional measurement means for measuring the position of said seat relative to said airbag, said additional measurement means generating a third signal, and third input means coupled to said additional measurement means and to said processor for inputting said third signal into said processor, said processor being arranged to determine the flow of gas out of said airbag after initial inflation of said airbag based on said at least one measured morphological characteristic and the position of said seat relative to said airbag such that said second control means control the gas flow out of said airbag based on said at least one morphological characteristic and the position of said seat relative to said airbag.

7. The system in accordance with claim 4, wherein said seat has an attached headrest and said measurement means comprises transducers attached to said headrest.

8. The system in accordance with claim 4, wherein said seat has a headrest portion, said measurement means comprising transmitter means attached to said headrest portion of said seat for transmitting radiation to illuminate different portions of the occupant's head, receiver means attached to said headrest portion of said seat for receiving a set of third signals representative of radiation reflected from different portions of the occupant's head and generating a set of fourth signals representative of the distances from said headrest portion to the nearest illuminated portion of the occupant's head, and height processor means for receiving said fourth set of signals from said receiver means and for determining the vertical location of the top of the occupant's head relative to said horizontal surface of said seat based thereon.

9. The system in accordance with claim 8, wherein said radiation is ultrasonic radiation or electromagnetic radiation.

10. The system in accordance with claim 8, further comprising movement means for moving said headrest portion of said seat in a vertical direction.

11. The system in accordance with claim 8, wherein said transmitter means comprises a phase array.

12. The system in accordance with claim 8, wherein said vehicle further comprises a seatbelt associated with said seat and seatbelt anchorage adjustment means for adjusting said seatbelt about an adjustable upper anchorage point, said height processor means producing an output signal which is passed into said seatbelt anchorage adjustment means to automatically adjust the seatbelt anchorage point relative to the height of the occupant from the horizontal surface of said seat.

13. The system in accordance with claim 5, wherein the vehicle has a floor to which said seat is mounted, said seat having an upper surface and a lower surface, said lower surface being deformable in response to a load placed on said upper surface, an occupant being able to sit on said upper surface, said measurement means comprising deflection sensing means situated in contact with said lower surface of said seat for determining deflection of said lower surface of said seat toward said floor, said deflection sensing means producing a signal representative of the deflection of said lower surface of said seat, weight processor means for determining the weight of the occupant based on said signal received from said deflection sensing means, and input means coupled to said deflection sensing means and to said weight processor means for inputting said signal into said weight processor means.

14. The system in accordance with claim 13, wherein said deflection sensing means comprises a linear variable differential transformer.

15. In a motor vehicle having a passenger compartment with interior surfaces, a seat on which an occupant sits, and an airbag system with at least one deployable airbag inflatable with a gas to deploy into a position between the occupant and the surfaces in the event of a crash of the vehicle, a control system for said airbag system comprising:

(a) measurement means mounted in association with said seat for measuring at least one morphological characteristic of the occupant;

(b) control means arranged in connection with said airbag for controlling the rate of energy dissipation from said airbag after initial inflation of said airbag by regulating the removal of gas in said airbag; and (c) determining means coupled to said measurement means for determining the desired flow of gas out of said airbag after initial inflation of said airbag for the occupant based on said at least one measured morphological characteristic and directing said control means to regulate the removal of gas from said airbag based on said desired flow of gas.

16. The system in accordance with claim 15, wherein said control means comprises a variable flow restrictor having a variable through passage in flow communication with an interior of said airbag.

17. In a motor vehicle having a passenger compartment with interior surfaces, a seat on which an occupant sits, and an airbag system with at least one deployable airbag inflatable with a gas to deploy into a position between the occupant and the surfaces in the event of a crash of the vehicle, said airbag system having control means for controlling the flow of gas into said airbag and the flow of gas out of said airbag after initial inflation thereof, the improvement comprising     a control system for said airbag system based on the height of the occupant, said control system comprising measurement means for measuring the height of the occupant from a base of the seat,     determining means for receiving the measured height of the occupant and determining a desired gas flow into and out of said airbag for the occupant based on the height of the occupant, and     flow variation means coupled to said determining means and said airbag for controlling the gas flow into and out of said airbag based on the height of the occupant.

18. The motor vehicle in accordance with claim 17, further comprising additional measurement means for measuring the weight of the occupant, said determining means receiving the measured weight of the occupant and determining the gas flow into and out of said airbag for the occupant based on the height and weight of the occupant such that said flow variation means control said gas flow into and out of said airbag based on the height and weight of the occupant.

19. The motor vehicle in accordance with claim 17, wherein said seat has a headrest portion, said measurement means comprising transmitter means attached to said headrest portion of said seat for transmitting radiation to illuminate different portions of the occupant's head, receiver means attached to said headrest portion of said seat for receiving a set of first signals representative of radiation reflected from said different portions of the occupant's head and generating a set of second signals representative of the distances from said headrest portion to the nearest illuminated portion of the occupant's head, and said measuring means receiving said second set of signals from said receiver means and for determining the vertical location of the top of the occupant's head relative to said base of said seat based thereon.

20. The motor vehicle in accordance with claim 17, further comprising movement means for moving said headrest portion of said seat in a vertical direction.

* * * * *